July 19, 1960   E. C. MILBERGER   2,945,809
THICKENED LUBRICANT AND PROCESS FOR PREPARING THE SAME
Filed Aug. 5, 1954

INVENTOR
ERNEST C. MILBERGER

BY Leland L. Chapman
HIS ATTORNEY

United States Patent Office 2,945,809
Patented July 19, 1960

2,945,809

THICKENED LUBRICANT AND PROCESS FOR PREPARING THE SAME

Ernest C. Milberger, Maple Heights, Ohio, assignor to The Standard Oil Company, Cleveland, Ohio, a corporation of Ohio Filed Aug. 5, 1954, Ser. No. 448,093

4 Claims. (Cl. 252—28)

The present invention relates to superior silica aerogels for use in formulating greases, and to greases prepared employing such special silica aerogels as the thickening agent.

In J. Phys. Chem. Volume XXXVI, Number 1, pages 52 to 64 (January 1932), S. S. Kistler describes methods for the preparation of silica aerogels in which the original hydrogel or alcogel structure is retained substantially intact. These gels are manufactured from hydrogels of silica made by precipitating silica by addition of sulfuric acid to sodium silicate solution in the well known manner and washing the gel relatively free of salts and sulfuric acid with water. The resulting aquogel or hydrogel may be converted into an alcogel by washing with alcohol. The liquid phase, whether water or alcohol, as the case may be, then is removed by raising the gel to the critical temperature of the liquid contained therein, while maintaining the pressure on the system sufficiently high to ensure that the liquid phase will remain liquid until the critical temperature is reached. At this point the liquid will be releasing the pressure pass into the gaseous state without the formation of menisci that cause liquid interference. The gas in the alcogel structure then may be released as desired, and an aerogel is obtained. The degree of porosity of the aerogel may be controlled to a large degree by controlling the concentration of silica in the hydrogel as it is precipitated, i.e., by controlling the concentration of sodium silicate in the original solution from which the hydrogel is prepared.

In the method of preparing the aerogels now said to be in commercial use, the liquid is removed by heating in an autoclave at temperatures and pressures above the critical temperatures and pressures of the liquid, and the product then is drawn through a suction line or a centrifugal fan to reduce it to small particles.

The resulting product has found utility in many ways. Granular particles, for example, may be employed as insulation for refrigerators and the like. Powders may be employed in lacquers.

It has been proposed in U.S. Patent No. 2,260,625, dated October 28, 1941, that the powdered product obtained as set forth be employed as the thickening agent for mineral lubricating oils in the preparation of thickened lubricants analogous to greases. In the procedure of this patent, the oil is ground with the unground aerogel (the aerogel obtained after drawing the gel through the centrifugal fan employed to create the suction required to remove the mass from the autoclave; about 70% of this mass, after drawing through the fan, will pass a 100 mess screen and 10% is 60 mesh or higher). When the unground aerogel is employed as the thickening agent, about 10% of unground aerogel by weight of the mixture is required. However, the patentee indicates that when a more finely ground aerogel is employed, although a smoother, more uniform suspension is obtained thereby, a larger amount of the ground aerogel is required to give the same results. Thus where 10% of unground aerogel is required, employing a motor oil having a viscosity of 10 seconds Saybolt at 100° F., an aerogel which has been ground in a ball mill for from 1 to 2 hours must be employed in an amount of about 20% by weight in order to form a grease of satisfactory consistency, and when it has been ground from 20 to 24 hours, 30% or more of aerogel may be required. The greases prepared as set forth in this patent are described as possessing good stability at temperatures as high as 100° C. Surprisingly, however, it has been found quite difficult to prepare a silica aerogel base grease having satisfactory stability at temperatures as high as 400° F. (204° C.), such as are encountered in use in some engines.

Accordingly, it is an object of the present invention to provide an inorganic silica aerogel useful to produce a lubricant having a high temperature stability at temperatures in the range from 200 to 400° F., and to the lubricants thereby obtained.

It is a further object to provide a silica aerogel useful to produce a lubricant, of which silica aerogel smaller quantities are needed than had heretofore been used to thicken the oil, and which can be used to formulate a thickened lubricant by simple mixing, without the necessity of grinding, or other techniques utilizing high shear stresses.

It has been determined, in accordance with the invention, that certain physical properties of inorganic silica aerogel thickening agents are quite important in order to produce a grease having the desired optimum characteristics.

The invention will be understood from the following description and from the drawings forming a part of this specification in which.

Figure 1:
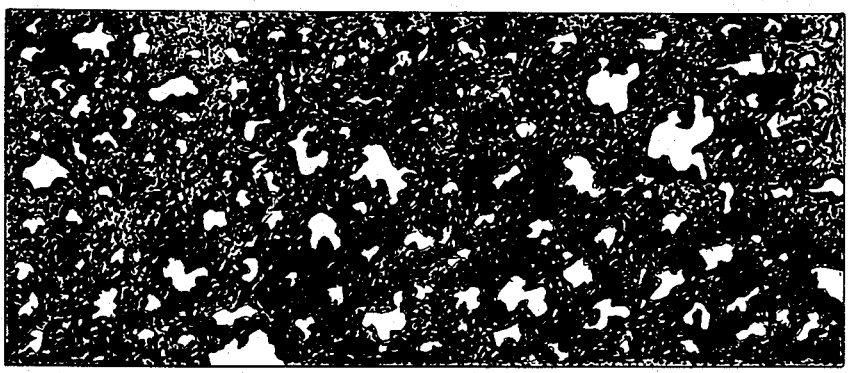
Figure 1 is a photolithograph representing a 17,000 diameter enlargement of a grease prepared from a silica aerogel in accordance with the invention.

The silica aerogel in accordance with the invention is characterized by having been prepared from a hydrogel or aquogel containing less than approximately 8% $SiO_2$. The terms "hydrogel" and "aquogel" are used herein to refer to the aqueous gel obtained by precipitation of a soluble sodium silicate from an aqueous solution thereof by addition of an acid. The term "alcogel" refers to the product obtained by replacing the aqueous phase of a hydrogel or aquogel by an alcohol such as ethyl alcohol. These are the conventional meanings of these terms in this art.

The hydrogel or aquogel in accordance with the invention can be prepared from an aqueous alkaline solution of any soluble sodium silicate, i.e., from any aqueous silicic acid solution. Silicic acid dissolves in caustic alkalies and the alkali silicates can be obtained from various natural minerals and clays or by fusing silicon dioxide with alkali hydroxides or carbonates. Fused alkali silicates, such as water glass, sodium tetrasilicate $Na_2Si_4O_9$, can be completely dissolved on long heating with water, but the result is not a solution of the silicate as such, but of silicic acid peptised by alkali, as well as free alkali. By addition of an acid to such a solution, for example, an inorganic acid, such as sulfuric acid, hydrochloric acid, or carbonic acid, or an organic acid, such as acetic acid, oxalic acid and formic acid, the silicic acid is precipitated in the form of a gel, the hydrogel or aquogel of the invention. The structure of this gel has not been fully elucidated but it is generally accepted that it is composed of a honeycomb structure of the silicon dioxide $SiO_2$ within the pores of which is enclosed the aqueous solution remaining after precipitation of the silicic acid. Thus it can be generally stated that the hydrogel of the invention can be obtained starting from any water-soluble alkali silicate, including not only water glass as mentioned above but sodium metasilicate $Na_2SiO_3$, the sodium metasilicate nonahydrate $Na_2SiO_3 \cdot 9H_2O$, and sodium disilicate $Na_2Si_2O_5$. All of these silicates are soluble in water in which they decompose to form silicic acid solution.

Such an aqueous solution of silicic acid will contain sufficient $SiO_2$ in solution to form a hydrogel containing less than about 8% silica after gel formation by addition of the acid. This can readily be calculated depending upon the amount of acid which is required to acidify the solution and whether the acid employed is concentrated or dilute. It is not necessary to characterize the silicic acid solution in terms of the alkali content calculated either as $Na_2O$ or as $NaOH$ inasmuch as this forms a salt with the anion of the acid employed and is washed out of the aquogel at the time of alcogel formation.

It may be noted that the 8% $SiO_2$ concentration in the hydrogel is the maximum silica concentration. The minimum is not critical but it is usually desirable for economic reasons to employ hydrogels containing not less than about 3% $SiO_2$. The preferred silica content lies within the range from 5 to 8% $SiO_2$ inasmuch as at these concentrations alcogels are produced which do not undergo undue shrinkage in the autoclave.

After formation of the gel the resulting hydrogel is washed free from salts and excess acid and then converted to an alcogel by soaking in ethyl alcohol or some other water-soluble volatile aliphatic alcohol. Several portions of the alcohol may be necessary completely to remove the aqueous solution. The resulting alcogel is loaded into an autoclave and heated at a temperature and pressure above the critical temperature and pressure of ethyl alcohol to convert the ethyl alcohol into a gas without destroying the gel structure. Upon releasing the autoclave pressure, the ethyl alcohol gas escapes. The gel is then devolatilized, i.e., freed from all traces of ethyl alcohol and other volatile organic matter and any air which may have entered the gel structure as the volatiles escaped, by heating it for ½ hour at a temperature of from about 1200° to about 1800° F. preferably about 1500° F. The removal of this volatile organic matter is believed to be responsible at least in part for the improved gelling efficiency of this aerogel, compared to undevolatilized aerogels. The devolatilized aerogel is reductionized, as in a whirling grinder, to a secondary agglomerate particle size of from 1 to 6 microns.

The silica aerogel thus obtained has the following properties:

| | |
|---|---|
| pH | 2.5–5.0 (4 g. in 100 g. $H_2O$). |
| Average secondary agglomerate particle size before simple mixing with the oil | 1–6 microns. |
| Average particle size after simple mixing with the oil | Not over about 0.25 micron. |
| $SiO_2$ | 93–96%. |
| Volatiles [1] | 0.5 to 4.0%. |

[1] After heating at 800° C. for ½ hour. Primarily water absorbed from the atmosphere; substantially no organic materials are present, due to devolatilization procedure.

The above properties are important as regards the thickened lubricant, and are given to completely characterize the silica aerogel.

The change in particle size of the abovedescribed silica aerogel after simple mixing with the oil is quite unexpected and is not characteristic of other silica aerogels. The silica aerogels of the invention readily break down to a particle size of 0.25 micron or less. In contrast, silica aerogels prepared from a 9.5% $SiO_2$ hydrogel whether devolatilized or not, and silica aerogels prepared from a 7% $SiO_2$ hydrogel but not devolatilized are not appreciably broken down on simple mixing. "Simple mixing," as the term is used herein, refers to hand mixing or mechanical mixing using a stirrer or paddle. Mixing techniques involving the application of high shearing forces, as in colloid or ball mills, are excluded by this definition.

The lubricating oil to be used in the grease of the invention may have any lubricating viscosity. It may be raw oil, acid-refined or solvent-refined, as required for the particular lubricating need.

The nature of the base oil has been found to make little difference in the relative consistencies of the thickened lubricants, and conventional acid-refined oils produce slightly thicker lubricants than solvent-refined oils. Excellent working stability is obtained regardless of the type of the base oil. An increase in the viscosity of the base oil, as might be expected, brings increased viscosity to the thickened lubricant and minimizes bleeding. The change is relatively small and fairly linear. The viscosity of the oil does not affect the working stability of the lubricant.

The relative proportions of the silica aerogel of the invention and the oil will vary somewhat, depending upon the desired body in the thickened lubricant. Lubricants made with low viscosity oils require a somewhat larger amount of the silica aerogel of the invention to give a lubricant of the same penetration. The thickened lubricant may vary in consistency from the consistency of a slightly thickened oil to a solid or semisolid of greaselike consistency. In general, the amount of the silica aerogel of the invention falls within the range of 5 to 20% and in most cases would fall within the range of 7 to 12%. A thickened lubricant containing 8% aerogel is a very satisfactory product which meets nearly all commercial needs, and contains a smaller proportion of aerogel than has heretofore been required, using prior available aerogels.

The amount of the silica aerogel, as might be expected, affects the consistency of the thickened lubricant in that an increase in its concentration brings a corresponding increase in consistency. The range is fairly linear and the amount of the silica aerogel can be selected with relation to the consistency desired, in view of the information in the following examples. While the difference is slight, the lubricants made at lower concentrations of silica aerogel possess better working stability, while lubricants with larger amounts of silica aerogel show slightly improved temperature susceptibility characteristics. The bleeding tendencies are decreased by increasing concentrations of the silica aerogel. The properties of the thickened lubricant are remarkably independent of composition variables other than the relative concentration of the silica aerogel, which concentration effects the most significant alteration in properties, particularly with regard to the final consistency of the product. This permits the manufacture of thickened lubricants having a wide variety of consistencies. In any consistency, less of the new aerogel is required than of the aerogels heretofore available.

The composition is made simply by mixing the silica aerogel and the oil by any simple mixing technique. No grinding is necessary.

The composition of the invention is not limited to the oil and silica aerogel of the invention. Any of the materials conventionally added to lubricants and greases may be included. For example, a hydrophobic cationic water-stabilizing agent can be added to impart water-resistance to the aerogel grease.

In general, it may be stated that organic nitrogen compounds which contain a cationic functional group comprising an amino or quaternary nitrogen radical can impart water-resistance in varying degrees to the thickened lubricant of the invention. These organic nitrogen compounds have a long chain aliphatic group of recognized hydrophobic-imparting properties in addition to the surface-active amino or quaternary nitrogen radical. Thus the compounds are water-insoluble, due to the hydrophobic group, and oil-dispersible and surface-active, due to the cationic functional group.

Primary amines having from 8 to 18 carbon atoms, such as cetylamine, octylamine, decylamine, myristylamine, palmitylamine and octadecylamine, are useful as water-stabilizing agents under certain circumstances.

Amines having an imidazoline nucleus with a hydroxyethyl or polyamino radical at the 1-position and an alkyl or alkylene radical of from 11 to 18 carbon atoms at the 2-position are very effective water-stabilizers. Greases to which these agents are added in a sufficient concentration will be resistant to decomposition even by boiling water. Typical imidiazolines of these types are 1-$\beta$-hydroxyethyl-2-heptadecenyl imidazoline, 1-$\beta$-hydroxyethyl-2-heptadecyl imidazoline, 1-$\beta$-hydroxyethyl-2-undecyl imidazoline, 1-triethylenetriamino-2-undecyl imidazoline, 1-diethylenediamino-2-heptadecenyl imidazoline, 1-($\beta$-imidazolino) ethylene-2-heptadecenyl imidazoline, 1-($\omega$-imidazolino) diethyleneamino-2-undecyl imidazoline, 1-$\beta$(2-heptadecenyl-imidazolino) ethylene-2-methyl imidazoline, and 1-$\beta$-(2-pentadecyl imidazolino) ethylene-2-pentadecyl imidazoline.

In general, from 0.1 to about 5% water stabilizing agent will be effective.

The expression "consisting essentially of" as used herein is intended to refer to the components which are essential to the composition, namely, the oil and the silica aerogel, and the expression does not exclude other components from the composition which do not render it unsuitable for lubrication, such materials being, for example, cationic water stabilizers, high polymers to modify viscosity or viscosity index, materials to impart tackiness, lubricating solids, such as graphite, antioxidant additives, corrosion inhibitors of various types, sulfur additives to render the lubricant suitable for use in gear for cutting, grinding, etc.

The following examples are given to illustrate the advantages obtainable when silica aerogels having the properties set forth above are employed in accordance with the invention to formulate greases.

The silica aerogels illustrated in the following examples can be prepared as set forth in the Kistler article referred to. Reference also is made to three patents, Nos. 2,093,454, dated September 21, 1937, 2,188,007, dated January 23, 1940, and 2,249,767, dated July 22, 1941. Three variables primarily determine the characteristics of the aerogel of the invention, and distinguish it from the various commercially available silica aerogels. These are: (1) the concentration of the hydrogel, expressed as percent $SiO_2$, (2) the particle size of the final aerogel, and (3) whether or not the aerogel has been devolatilized in the course of its preparation.

The conventional steps of preparing the initial aerogel through use of high pressure in an autoclave are adequately set forth in the literature referred to above and further details are not required. Following preparation of the aerogel, it can be devolatilized by passing it through a heating chamber at approximately 1500° C. and heating it therein for ½ hour under vacuum to remove the air and residual alcohol in the aerogel structure. This increases the density of the aerogel somewhat. An aerogel can be reductionized before or after it is devolatilized by simple grinding or passing through a whirling grinder. This is capable of reducing the secondary agglomerate size to within the range from 1 to 6 microns in diameter.

The following examples show seven types of silica aerogels, of which the last two are in accordance with the invention. The important distinguishing procedural steps characterizing the preparation of these aerogels are given in Table I. The aerogels of Examples 1 to 5, inclusive, have been commercially available for various purposes. The aerogels of Examples 6 and 7 are aerogels of particularly valuable properties when employed in greases in accordance with the invention.

*Table I*

| Example No. | Percent $SiO_2$ of Hydrogel | Devolatilized | Reductionized | Particle size |
|---|---|---|---|---|
| 1 | 9.75 | No | Yes | 3 to 5$\mu$. |
| 2 | 7.0 | Yes | No | Grains the size of rice. |
| 3 | 7.0 | No | Yes | 1 to 6$\mu$. |
| 4 | 9.75 | Yes [1] | Yes | 3 to 5$\mu$. |
| 5 | 9.75 | Yes | Yes | 3 to 5$\mu$. |
| 6 | 7.0 | Yes | Yes | 1 to 6$\mu$. |
| 7 | 7.0 | Yes | Yes [2] | 1 to 6$\mu$. |

[1] After being reductionized. All the others are devolatilized before
[2] Densified by compacting in a vacuum after being reductionized.

These silica aerogels vary appreciably in apparent density, as the following table shows:

*Table II*

| Aerogel of Example No.— | Density, g./ml. |
|---|---|
| 1 | 0.082 |
| 5 | 0.037 |
| 6 | 0.029 |
| 7 | 0.056 to 0.064 |

Greases were made with the silica aerogels of Examples 1 and 3 to 7 set forth above, and their gelling efficiency determined. The aerogel of Example 2 had too large a particle size to form a uniform, homogeneous grease with simple mixing. In all cases, 8% of silica aerogel was employed with 92% of a 250 SSU (at 210° F.) solvent-extracted neutral oil, with the exception of the silica aerogel of Example 1. In this case, in order to obtain a grease thick enough for a penetration measurement, 10% silica aerogel was required.

The gelling efficiency was determined by the following test: At a temperature of 85° F. the silica aerogel is slowly added with stirring to the solvent-extracted neutral oil in several portions at such a rate that the silica aerogel is wet immediately. Immediately after the last bit of silica aerogel has been wetted, the material is transferred to an ASTM grease worker and subjected to 1000 strokes at 85° F. The ASTM penetration of the resulting material is taken as a measurement of the gelling efficiency of the silica aerogel. The results of this test on the silica areogels of the above examples are set forth in Table III.

*Table III*

| Silica Gel of Example No.— | Percent $SiO_2$ of Hydrogel | Devolatilized | Percent Silica Aerogel | Penetration |
|---|---|---|---|---|
| 1 [1] | 9.75 | No | 10 | 340 |
| 3 [1] | 7.0 | No | 8 | 320 |
| 4 [1] | 9.75 | Yes | 8 | 369 |
| 5 [1] | 9.75 | Yes | 8 | 345 |
| 6 | 7.0 | Yes | 8 | 297 |
| 7 | 7.0 | Yes | 8 | 296 |

[1] The powdered product of commerce that was available prior to the development of the aerogel used in the invention.

In this test a low penetration value represents a high gelling efficiency. The data in Table III therefore indicates that the silica aerogels of Examples 6 and 7 show superior gelling ability. Moreover, silica aerogels prepared from a hydrogel containing 7% $SiO_2$ and which had been devolatilized (Examples 6 and 7) show superior gelling ability, as compared to an aerogel which had not been devolatilized (Example 3). The silica aerogels in accordance with the invention (Examples 6 and 7) are superior to any of the other silica aerogels tested. It is also apparent that 8% of the silica aerogels of the invention (Examples 6 and 7) gives a higher grease yield, i.e., a greater consistency for the amount of silica aerogel employed, than does 10% of the silica aerogel of Example 1. This is due to their property of breaking down further upon simple mixing with the oil.

The silica gels of Examples 4 and 5 differ from the silica aerogels of Examples 6 and 7 only in hydrogel silica content and might be expected to show similar gelling characteristics to the silica aerogels of Examples 6 and 7. Surprisingly, however, the data show that silica aerogels of the invention are superior to the silica aerogels of either Example 4 or 5. This shows the significance of the hydrogel silica content in imparting the property of breaking down further upon simple mixing with the oil.

Comparison of the data for Examples 3, 6 and 7 shows that the silica aerogels of Examples 6 and 7 are superior. The silica aerogel of Example 3 was not devolatilized, but in other respects was identical to the silica aerogels of Examples 6 and 7. Therefore, the devolatilization procedure enhances the gelling efficiency. This is also indicated by a comparison of Examples 4 and 5 with Example 1. It is evident that 8% of the devolatilized silica aerogels of Examples 4 and 5 gives penetrations approximately equivalent to that obtained when 10% of the silica aerogel of Example 1 is used.

Finally, a comparison of the silica aerogels of Examples 3, 6 and 7 with the silica aerogels of Examples 4 and 5 affords an evaluation of the effects of hydrogel silica content and the devolatilization step. Despite the fact that the silica aerogels of Examples 4 and 5 have been devolatilized and the silica aerogel of Example 3 has not, the latter is still a more efficient gelling agent. This indicates that the lower hydrogel silica content of this silica aerogel probably contributes more to the gelling ability. However, the devolatilization step also exerts an appreciable beneficial effect, as is evidenced by a comparison of Examples 3, 6 and 7. Both steps together apparently are quite important to the property of the aerogel of breaking down further upon simple mixing with the oil.

Stability of greases prepared as set forth at high temperatures was measured by the block test, which measures the ability of a grease to resist changes in consistency under temperatures up to 400° F., followed by shearing action.

In this test a 150 ml. beaker is approximately half filled with a test grease, then placed in an aluminum block furnace and heated to 400° F. The beaker is removed, allowed to cool to room temperature and stirred vigorously. A Kaufmann micropenetration measurement (Ind. Eng. Chem., Analytical Edition, 11, 108–110 (1939)) is then obtained.

Data obtanied from greases made from the silica aerogels of Examples 1 and 7 are given in Table IV.

*Table IV*

| Example No. | Percent Silica Gel | Penetration | | Percent Increase |
|---|---|---|---|---|
| | | Original | Final | |
| 1 | 10 | 92 | Soup | |
| 1 | 10 | 92 | Soup | |
| 7 | 8 | 77 | 120 | 56.0 |
| 7 | 8 | 99 | 153 | 54.5 |

In these results, a low increase in micropenetration indicates superior resistance to high temperatures. The greases prepared from the silica aerogel of Example 7 have superior characteristics under conditions of high temperature and high shearing. The greases prepared from the silica aerogel of Example 1 completely lost their grease characteristics and became soupy under the conditions of this test.

The relative bleeding tendencies of greases containing these silica aerogels were determined by a rapid method, utilizing the Herschel grease press (ASTM Proceedings 33(1):343 (1933) described by Farrington, Ind. Eng. Chem., 31, No. 2, pages 230 to 235 (1939)). The results are given in Table V.

The greases tested in this test each contained varying amounts of Amine "O," 1-$\beta$-hydroxyethyl-2-heptadecenyl imidazoline, which was added to improve the water resistance of the test grease.

*Table V*

| Amount | Silica Aerogel of | Amine "O," Percent | Relative Bleeding Rate | | |
|---|---|---|---|---|---|
| | | | 1 min. | 3 min. | 5 min. |
| 10% | Example 1 | 1.0 | 2 | 4.3 | 6 |
| 8% | Example 7 | 0.8 | 1 | 2.6 | 4 |

It is evident from this data that the grease prepared from the silica aerogel of Example 7 exhibits less bleeding than does the silica aerogel of Example 1.

The relative water resistance characteristics of these two test greases were obtained by the standard plate test. In this test a 2 x 2 inch steel plate is coated with a uniform layer of the grease and then placed in boiling tap water for 60 minutes. The appearance of the coating on the plate is then observed. If it is substantially unchanged, i.e., if no separation of oil and silica aerogel occurs, then the grease is water-resistant. Both of these test greases passed this test for water-resistance.

Two greases were prepared employing the silca aerogels of Examples 1 and 6, and having the following formulation:

| | Grease A [1] | Grease B [2] |
|---|---|---|
| | Prepared from Aerogels of— | |
| | Example 1 | Example 6 |
| | Percent | Percent |
| Silica aerogel | 10.0 | 7.5 |
| Paratac [3] | 2.0 | 2.0 |
| Paraflow [4] | 0.5 | 0.5 |
| Methane base (Calco MB) [5] | 0.5 | 0.5 |
| Red dye | 0.02 | 0.02 |
| Amine "O" [6] | 1.0 | 0.75 |
| Solvent extracted unblended (neutral) oil (250 SSU at 100° F.) | 85.98 | 88.73 |

Figure 2:
Figure 2 is a photolithograph representing a 17,000 diameter enlargement of a grease of the same composition as the grease of Figure 1, but prepared employing a silica aerogel of the prior art.

[1] Grease illustrated in Figure 2.
[2] Grease illustrated in Figure 1.
[3] An isobutylene polymer sold by the Enjay Company, Inc. and commonly used in compounding greases.
[4] A Friedel-Crafts reaction product, made by condensation of a chlorinated paraffin wax with an aromatic hydrocarbon, useful as a pour point depressant and sold by the Enjay Company, Inc.
[5] Tetramethyldiaminodiphenylmethane.
[6] 1-$\beta$-hydroxyethyl-2-heptadecenyl imidazoline.

These greases were prepared by blending the aerogel, Amine "O," Paratac, Paraflow, methane base and red dye in the solvent-extracted oil at 85° F., using a simple paddle-type grease mixer. The silica aerogel was added slowly with stirring to the solvent-extracted oil in the mixer in several portions, at such a rate that the aerogel was wet immediately. A portion of the grease was set aside for determination of penetration. Another portion was photomicrographed in an electron microscope at a magnification of 17,000 diameters. The photomicrographs thus obtained are reproduced in Figures 1 and 2. Each of the above greases had a penetration of 324.

Reference to Figure 1 (of grease B above) shows that the silica aerogel particles of the grease represented by the white material of the photomicrograph, are considerably less than one micron in diameter, and, on the average, are less than 0.25 micron in diameter. In contrast, the grease of Figure 2 (grease A above) contains quantities of large secondary agglomerates of silica aerogel and very few particles as low as one micron in diameter. It appears from these photographs that on simple mixing the silica aerogel of the invention breaks down to particles of diameters smaller than 0.25 micron, whereas this is not true of the aerogel employed in preparing the grease of Figure 2.

Although 25% less aerogel is employed in the case of grease B, employing the aerogel of the invention, the resulting grease has the same penetration as grease A prepared employing the aerogel of Example No. 1, an aerogel of the prior art. This shows the increased gelling efficiency of the silica aerogels employed in accordance with the invention.

The gelling efficiency thus is directly correlated with the property of the aerogels of the invention of breaking down further upon simple mixing with the oil. The results of Table III supra thus are explainable on the basis that the aerogels of lesser gelling efficiency do not have this property.

It may be noted that even upon prolonged mixing in a colloid or ball mill for periods upwards of two to three hours, greases containing the aerogel of Example 1, i.e., greases of the type shown in Figure 2, do not yield greases of the type of Figure 1, which are obtainable with an aerogel used in making the grease of the invention. Photomicrographs taken employing the electron microscope show that the secondary agglomerate particle size of the aerogel of Example 1 is not broken down to any appreciable extent by colloid-milling for three hours or more. Electron photomicrographs of the aerogel of Example 1, and of the grease shown in Figure 2 show the aerogel to be substantially the same before and after mixing with the oil. This is to be contrasted with the aerogels of Examples 6 and 7 before and after simple mixing with the oil.

It will be appreciated that in view of the above many changes and modifications can be made in the invention. Accordingly, the invention is not to be limited except as set forth in the appended claims.

All parts and percentages in the specification are by weight.

This application is a continuation-in-part of Serial No. 246,205, filed September 12, 1951, and now abandoned.

I claim:

1. A thickened lubricant of good temperature susceptibility properties, consisting essentially of (1) a mineral lubricating oil of lubricating viscosity as the major component and (2) as the minor component a silica aerogel thickening agent in an amount sufficient to impart a grease consistency to the oil, said silica aerogel having been prepared from a hydrogel containing from 3 to about 8% $SiO_2$ by converting the hydrogel into an alcogel, volatilizing liquid contained in the alcogel to form an aerogel by heating at a temperature and pressure above the critical temperature and pressure of alcohol in the alcogel to convert the alcohol into a gas without destroying the gel structure, devolatilizing the aerogel by heating at a temperature of from about 1200° to about 1800° F. and then reducing the devolatilized aerogel to a secondary agglomerate particle size of from one to six microns, said silica aerogel being characterized by the following properties:

| | |
|---|---|
| pH | 2.5–5.0 (4 g. in 100 g. $H_2O$). |
| Average secondary agglomerate particle size before simple mixing with the oil | 1–6 microns. |
| Average particle size after simple mixing with the oil | Not over about 0.25 micron. |
| $SiO_2$ | 93–96%. |
| Total volatiles | 0.5 to 4.0% (after heating at 800° C. for ½ hour). |

2. The composition of claim 1 in which the amount of the silica aerogel is approximately 7 to 12%.

3. A method of making thickened lubricant of good temperature susceptibility properties which comprises combining a major amount of a mineral lubricating oil of lubricating viscosity and a sufficient amount of a silica aerogel thickening agent to impart a grease consistency to the oil, said silica aerogel having been prepared from a hydrogel containing from 3 to about 8% $SiO_2$ by converting the hydrogel into an alcogel, volatilizing liquid contained in the alcogel to form an aerogel by heating at a temperature and pressure above the critical temperature and pressure of alcohol in the alcogel to convert the alcohol into a gas without destroying the gel structure, devolatilizing the aerogel by heating at a temperature of from about 1200° to about 1800° F. and then reducing the devolatilized aerogel to a secondary agglomerate particle size of from one to six microns, said silica aerogel being characterized by the following properties:

| | |
|---|---|
| pH | 2.5–5.0 (4 g. in 100 g. $H_2O$). |
| Average secondary agglomerate particle size before simple mixing with the oil | 1–6 microns. |
| $SiO_2$ | 93–96%. |
| Total volatiles | 0.5 to 4.0% (after heating at 800° C. for ½ hour). | said combining of the oil and aerogel being accomplished by simple mixing of the two ingredients during which mixing the agglomerate aerogel particles break down to provide an average particle size in the oil of not over about 0.25 micron.

4. The method of claim 3 in which the amount of the silica aerogel is approximately 7 to 12%.

References Cited in the file of this patent

UNITED STATES PATENTS

| | | |
|---|---|---|
| 1,748,315 | Stoewener | Feb. 25, 1930 |
| 1,783,304 | Okatoff | Dec. 2, 1930 |
| 1,835,420 | Neundlinger | Dec. 8, 1931 |
| 2,260,625 | Kistler | Oct. 28, 1941 |
| 2,285,449 | Marshall | June 9, 1942 |
| 2,386,810 | Marisic | Oct. 13, 1945 |
| 2,392,767 | Robinson | Jan. 8, 1946 |
| 2,554,222 | Stross | May 22, 1951 |
| 2,573,650 | Peterson | Oct. 30, 1951 |
| 2,583,603 | Sirianni et al. | Jan. 29, 1952 |
| 2,584,085 | Stross | Jan. 29, 1952 |
| 2,655,476 | Hughes et al. | Oct. 13, 1953 |
| 2,660,564 | Davis | Nov. 24, 1953 |
| 2,711,393 | Hughes et al. | June 21, 1955 |

OTHER REFERENCES

Silica Aerogel for Protecting Stored Seed or Milled Cereal Products From Insects, Cotten et al., Journal of Econ. Entomology, vol. 42, No. 3, June 1949, page 553.